US012734721B2

(12) United States Patent
Book et al.

(10) Patent No.: US 12,734,721 B2
(45) Date of Patent: Sep. 15, 2026

(54) PUSHER ASSEMBLY FOR A FOOD PROCESSOR ASSEMBLY

(71) Applicant: WHIRLPOOL CORPORATION, Benton Harbor, MI (US)

(72) Inventors: William Gregory Book, Grand Haven, MI (US); Benjamin Booth Edinger, Grand Haven, MI (US); Zachary Davidson Graves, Norton Shores, MI (US); Michael A. Johnson, West Olive, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 451 days.

(21) Appl. No.: 18/457,734

(22) Filed: Aug. 29, 2023

(65) Prior Publication Data

US 2025/0073940 A1 Mar. 6, 2025

(51) Int. Cl.
*B26D 7/06* (2006.01)
*A47J 43/07* (2006.01)

(52) U.S. Cl.
CPC ........... *B26D 7/0608* (2013.01); *A47J 43/07* (2013.01); *B26D 2210/02* (2013.01)

(58) Field of Classification Search
CPC .............................. A47J 43/07; B26D 7/0608
See application file for complete search history.

(56) References Cited

U.S. PATENT DOCUMENTS

| | | | |
|---|---|---|---|
| 4,512,522 A | 4/1985 | Williams | |
| 4,819,882 A * | 4/1989 | Stottmann ............. | A47J 43/046 241/282.1 |
| 9,398,831 B2 | 7/2016 | Zakowski | |
| 2009/0162508 A1* | 6/2009 | Davies .................... | A47J 19/02 426/481 |
| 2020/0307013 A1 | 10/2020 | Mokhefi et al. | |

FOREIGN PATENT DOCUMENTS

| | | |
|---|---|---|
| CN | 111839039 A | 10/2020 |
| EP | 3307123 B1 | 8/2019 |

* cited by examiner

*Primary Examiner* — Elizabeth Insler
(74) *Attorney, Agent, or Firm* — Price Heneveld LLP

(57) ABSTRACT

A food processor assembly includes a receptacle for receiving food therein, a lid configured to selectively cover the receptacle and having a chute for conveying food into the receptacle, and a pusher assembly configured to push food through the chute and into the receptacle. The pusher assembly includes a pusher body and a spring that biases the pusher body relative to the lid to urge movement of the pusher body within the chute toward the receptacle.

16 Claims, 7 Drawing Sheets

PUSHER ASSEMBLY FOR A FOOD PROCESSOR ASSEMBLY

BACKGROUND OF THE DISCLOSURE

The present disclosure generally relates to a food processor assembly that includes a pusher assembly. More specifically, the present disclosure relates to a food processor assembly that includes a pusher assembly that is operable to move from a cocked condition to a fired condition to push food through a chute of a lid of the food processor assembly into a receptacle.

SUMMARY OF THE DISCLOSURE

According to one aspect of the present disclosure, a food processor assembly includes a receptacle for receiving food therein, a lid configured to selectively cover the receptacle and having a chute for conveying food into the receptacle, and a pusher assembly for insertion into the chute. The pusher assembly includes a pusher body, a catch feature movably coupled with the pusher body, and a spring operably coupled to the catch feature and the pusher body. The pusher assembly is operable between a cocked condition and a fired condition. In the cocked condition of the pusher assembly, the spring is in an extended condition and biased toward a contracted condition and the catch feature coupled to the spring is disposed at a first position along the pusher body proximate to a bottom of the pusher body and is engaged with the pusher body to maintain the spring in the extended condition. In the fired condition of the pusher assembly, the spring is in the contracted condition and the catch feature is disposed at a second position along the pusher body that is further than the first position from the bottom of the pusher body. Further, the catch feature is configured to be selectively engaged with an engagement feature coupled to the lid, such that movement of the pusher assembly from the cocked condition to the fired condition causes the pusher body to be drawn toward the receptacle within the chute.

According to another aspect of the present disclosure, a food processor assembly includes a receptacle for receiving food therein, a lid configured to selectively cover the receptacle and having a chute for conveying food into the receptacle, and a pusher assembly configured to push food through the chute and into the receptacle. The pusher assembly includes a pusher body, and a spring that biases the pusher body relative to the lid to urge movement of the pusher body within the chute toward the receptacle.

According to yet another aspect of the present disclosure, a pusher assembly for a food processor assembly includes a pusher body for insertion into a chute of said food processor assembly, and a spring operably coupled with the pusher body.

These and other features, advantages, and objects of the present disclosure will be further understood and appreciated by those skilled in the art by reference to the following specification, claims, and appended drawings.

Figure 1:
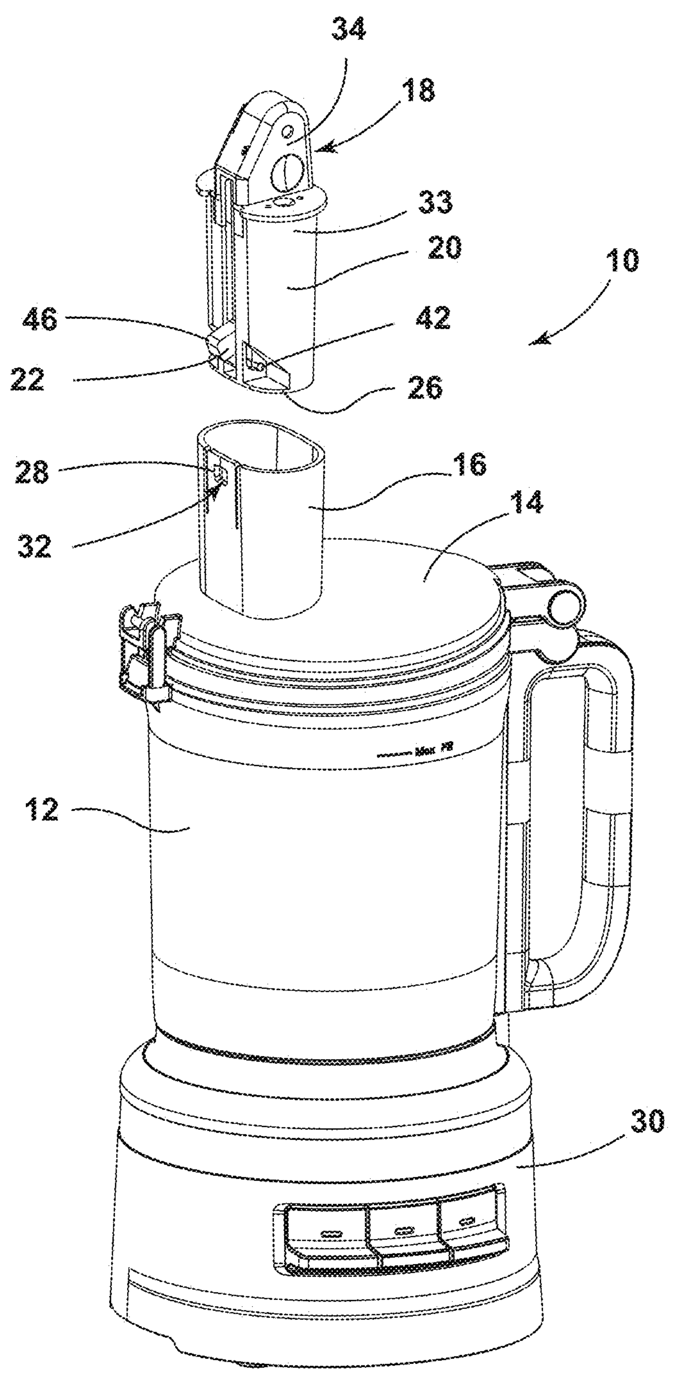
FIG. 1 is a top perspective view of a food processor assembly illustrating a base, a receptacle coupled to the base, a lid covering the receptacle and having a chute, and a pusher assembly configured to be received within the chute.

The components in the figures are not necessarily to scale, emphasis instead being placed upon illustrating the principles described herein.

DETAILED DESCRIPTION

The present illustrated embodiments reside primarily in combinations of apparatus components related to pusher assembly for a food processor assembly. Accordingly, the apparatus components have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

The terms "including," "comprises," "comprising," or any other variation thereof, are intended to cover a non-exclusive inclusion, such that an article or apparatus that comprises a list of elements does not include only those elements but may include other elements not expressly listed or inherent to such article or apparatus. An element preceded by "comprises a . . . " does not, without more constraints, preclude the existence of additional identical elements in the article or apparatus that comprises the element.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

In this document, relational terms, such as "first" and "second," "top" and "bottom," and the like, are used solely to distinguish one entity or action from another entity or action, without necessarily requiring or implying any actual such relationship or order between such entities or actions.

For purposes of this disclosure, the term "coupled" (in all of its forms: couple, coupling, coupled, etc.) generally means the joining of two components (electrical or mechanical) directly or indirectly to one another. Such joining may be stationary or movable in nature. Such joining may be achieved with the two components (electrical or mechanical)

and/or any additional intermediate members. Such joining may include members being integrally formed as a single unitary body with one another (i.e., integrally coupled) or may refer to joining of two components. Such joining may be permanent in nature, or may be removable or releasable in nature, unless otherwise stated.

The terms "substantial," "substantially," and variations thereof as used herein are intended to note that a described feature is equal or approximately equal to a value or description. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

With reference to FIGS. 1-7, a food processor assembly 10 includes a receptacle 12 for receiving food therein. A lid 14 is configured to selectively cover the receptacle 12. The lid 14 includes a chute 16 for conveying food into the receptacle 12. The food processor assembly 10 includes a pusher assembly 18 for insertion into the chute 16. The pusher assembly 18 includes a pusher body 20, a catch feature 22 removably coupled with the pusher body 20, and a spring 24 that is operably coupled to the catch feature 22 and the pusher body 20. The pusher assembly 18 is operable between a cocked condition and a fired condition. In the cocked condition, the spring 24 is in an extended condition and biased toward a contracted condition, and the catch feature 22 is disposed at a first position along the pusher body 20 that is proximate to a bottom 26 of the pusher body 20. In the cocked condition of the pusher assembly 18, the catch feature 22 is engaged with the pusher body 20 to maintain the spring 24 in the extended condition. In the fired condition, the spring 24 is in the contracted condition and the catch feature 22 is disposed at a second position along the pusher body 20 that is further than the first position from the bottom 26 of the pusher body 20. The catch feature 22 is configured to be selectively engaged with an engagement feature 28 coupled to the lid 14, such that movement of the pusher assembly 18 from the cocked condition to the fired condition causes the pusher body 20 to be drawn toward the receptacle 12 within the chute 16.

Referring now to FIG. 1, the food processor assembly 10 is illustrated. The food processor assembly 10 includes a base 30 having a motor (not shown) disposed therein. The receptacle 12 is selectively coupled with the base 30 and is configured to receive food therein for processing. The lid 14 is coupled to the receptacle 12 and configured to selectively cover an opening to the receptacle 12. The motor may be configured to drive a rotatable tool, such as a blade, to process food within the receptacle 12 when the lid 14 covers the opening to the receptacle 12, in various implementations. The lid 14 includes the chute 16. Food is configured to be conveyed through the chute 16 of the lid 14 and into the receptacle 12 for processing. In the embodiment illustrated in FIGS. 1-3, the chute 16 is integrally coupled with the portions of the lid 14 adjacent to the chute 16. It is contemplated that the chute 16 may be a removable portion of the lid 14 that may be decoupled from surrounding portions of the lid 14 for cleaning and/or various other purposes, in various embodiments. The chute 16 may include the engagement feature 28 for engagement with the catch feature 22 of the pusher assembly 18, as described further herein. For example, in the embodiment illustrated in FIGS. 1-3, the chute 16 defines a receiver 32 that is configured to receive a portion of the catch feature 22 therein. In the illustrated embodiment, the receiver 32 is an aperture, however, a variety of types of receivers 32 are contemplated (e.g., recess, channel, slot, depression, etc.). It is contemplated that the term "food processor assembly" can include a variety of types of handheld and/or counter kitchen rotary appliances that are configured to process food (e.g., blender, mixer, grinder, food processor, etc.).

Figure 2:
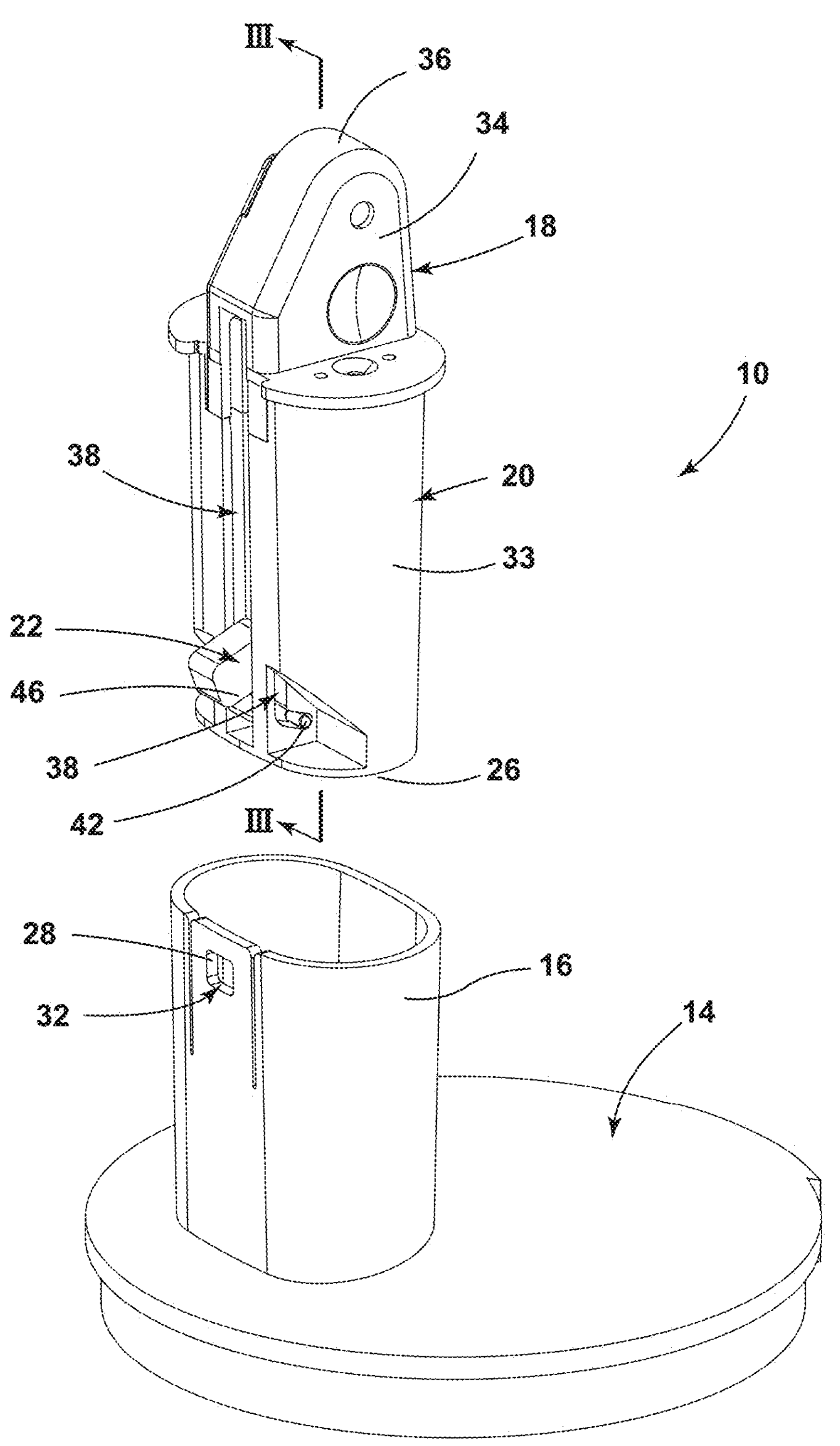
FIG. 2 is a top perspective view of a lid of a food processor assembly and a pusher assembly in a cocked condition.
Figure 3:
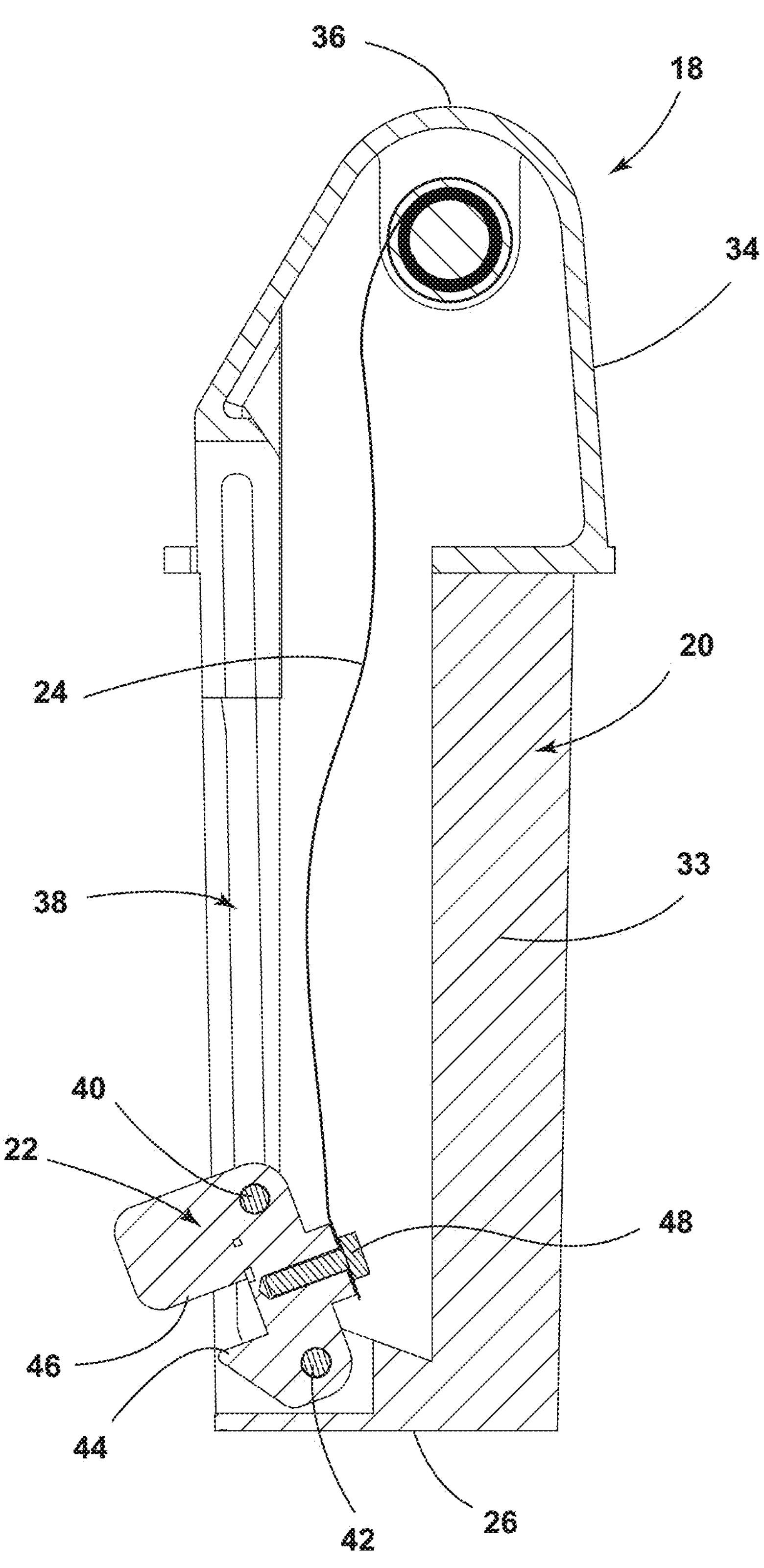
FIG. 3 is a cross-sectional view of the pusher assembly of FIG. 2 taken at line III-III illustrating the pusher assembly in the cocked condition, wherein a spring is in an extended condition.
Figure 4:
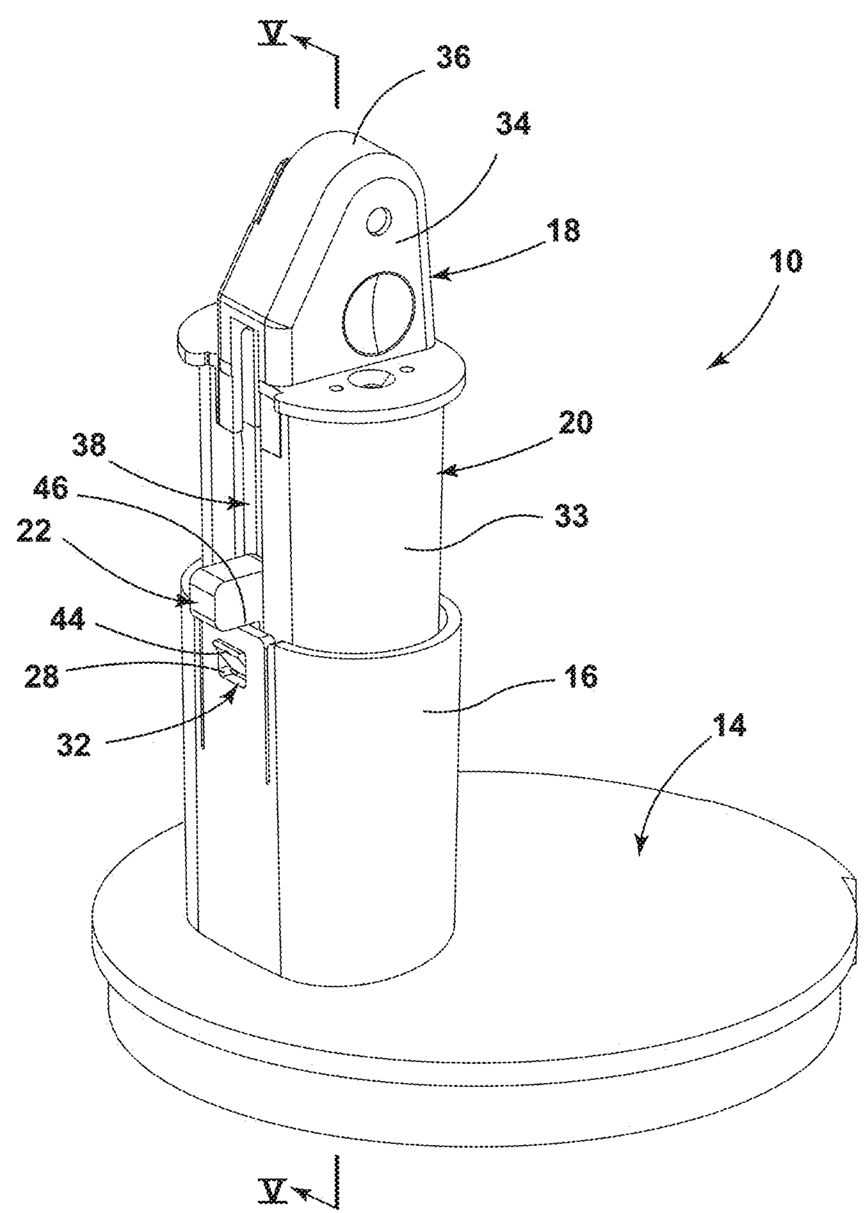
FIG. 4 is a top perspective view of a pusher assembly partially inserted into a chute of a lid of a food processor assembly.

Referring now to FIGS. 1-3, the food processor assembly 10 includes the pusher assembly 18. The pusher assembly 18 is configured to push food within the chute 16 into the receptacle 12 of the food processor assembly 10 during operation of the food processor assembly 10. The pusher assembly 18 includes the pusher body 20. In various implementations, the pusher body 20 is configured to contact the food that the pusher assembly 18 is configured to push through the chute 16 of the food processor assembly 10. For example, the bottom 26 of the pusher body 20 can be configured to contact the food in operation of the pusher assembly 18.

In some embodiments, the pusher body 20 includes a base 33 and a housing 34. The base 33 may form the bottom 26 of the pusher body 20, and the housing 34 may be positioned upward of the base 33 in an upright use position of the pusher assembly 18. The housing 34 may form a top 36 of the pusher body 20 that is opposite the bottom 26. In various implementations, the housing 34 houses the spring 24 in the fired condition of the pusher assembly 18. The housing 34 and the pusher assembly 18 may be integrally coupled with each other. In some implementations, the housing 34 and the base 33 may be separate components, and the pusher body 20 may be an assembly of a plurality of components, as illustrated in FIGS. 2 and 3.

Referring still to FIGS. 1-3, the pusher assembly 18 may define a channel 38. The channel 38 may be configured to receive the catch feature 22 therein for movement of the catch feature 22 along the channel 38 during operation of the pusher assembly 18, as described further herein. The channel 38 may be defined by the housing 34 and/or the base 33 of the pusher body 20, in various implementations.

As illustrated in FIGS. 1-3, the pusher assembly 18 includes the catch feature 22. The catch feature 22 is movably coupled with the pusher body 20, in various embodiments. In the embodiment illustrated in FIGS. 1-3, the catch feature 22 is movably disposed within the channel 38 defined by the pusher body 20. As illustrated, the catch feature 22 includes first and second pins 40, 42 that are slidably engaged with the channel 38 defined by the pusher body 20. In various implementations, the catch feature 22 includes a first catch 44 and a second catch 46. As illustrated in FIGS. 2 and 3, the first catch 44 is positioned nearer than the second catch 46 to the bottom 26 of the pusher body 20. The first and/or second catches 44, 46 of the catch feature 22 may be configured to interact with the chute 16 and/or the engagement feature 28 of the lid 14 of the food processor assembly 10, in various embodiments, as described further herein.

Figure 5:
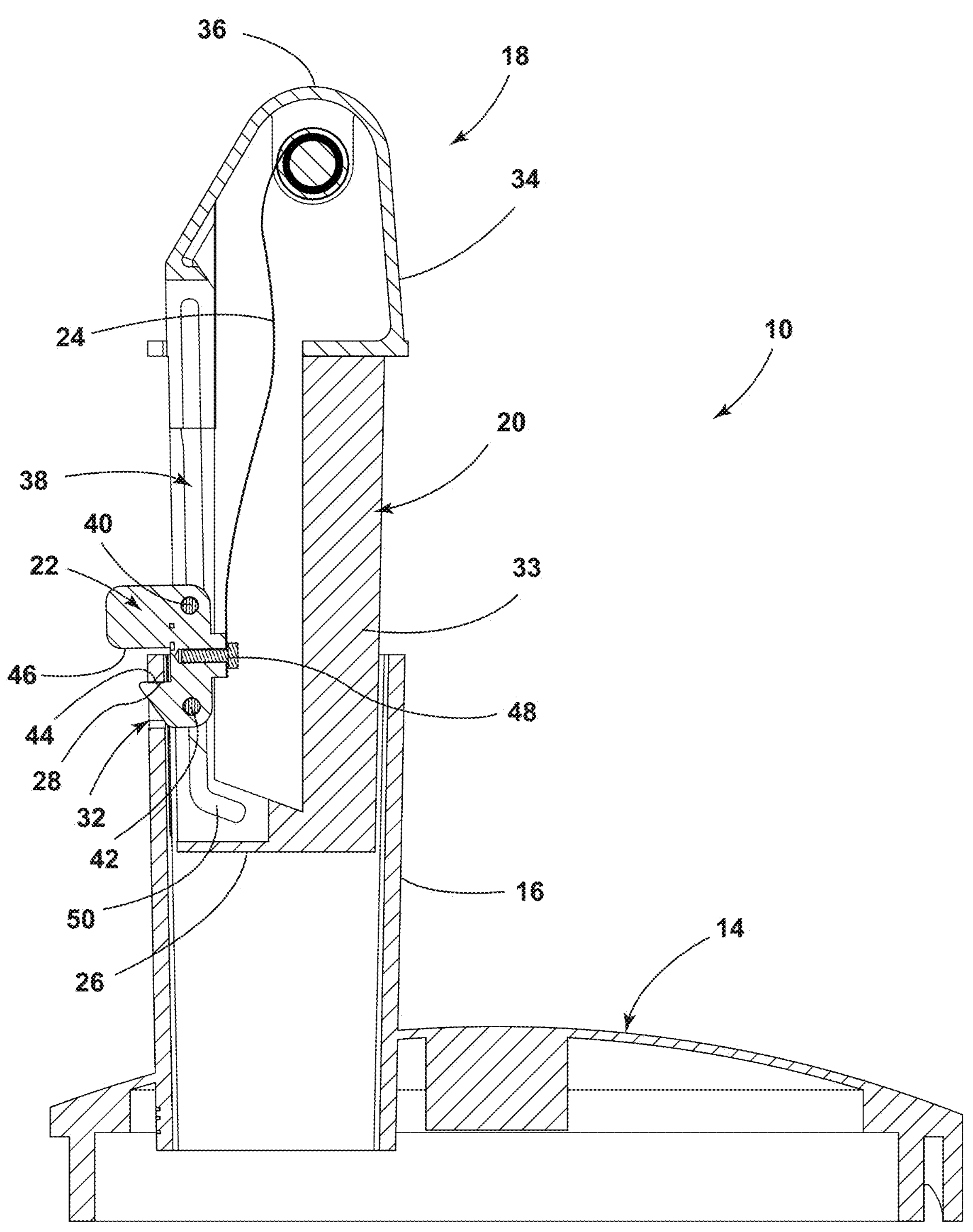
FIG. 5 is a cross-sectional view of the pusher assembly and the lid of the food processor assembly of FIG. 4 taken at line V-V illustrating a catch feature of the pusher assembly engaged with an engagement feature coupled to a chute of the lid.
Figure 6:
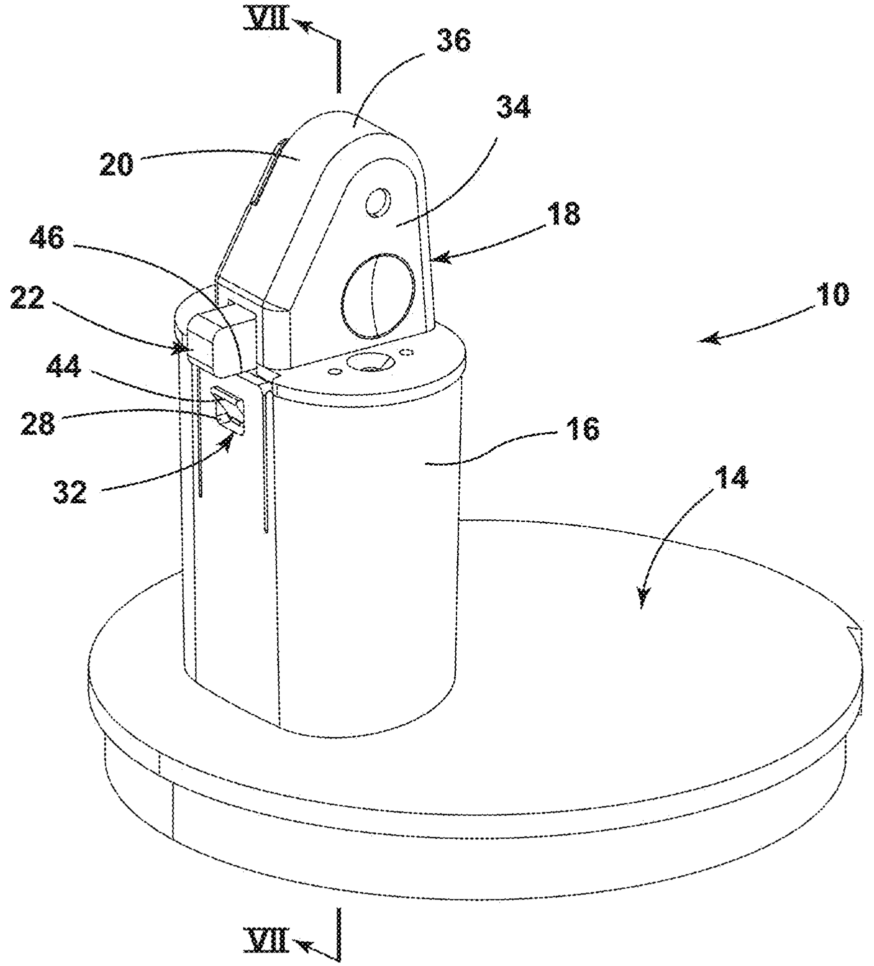
FIG. 6 is a top perspective view of a pusher assembly in a fired condition disposed within a chute of a lid of a food processor assembly.
Figure 7:
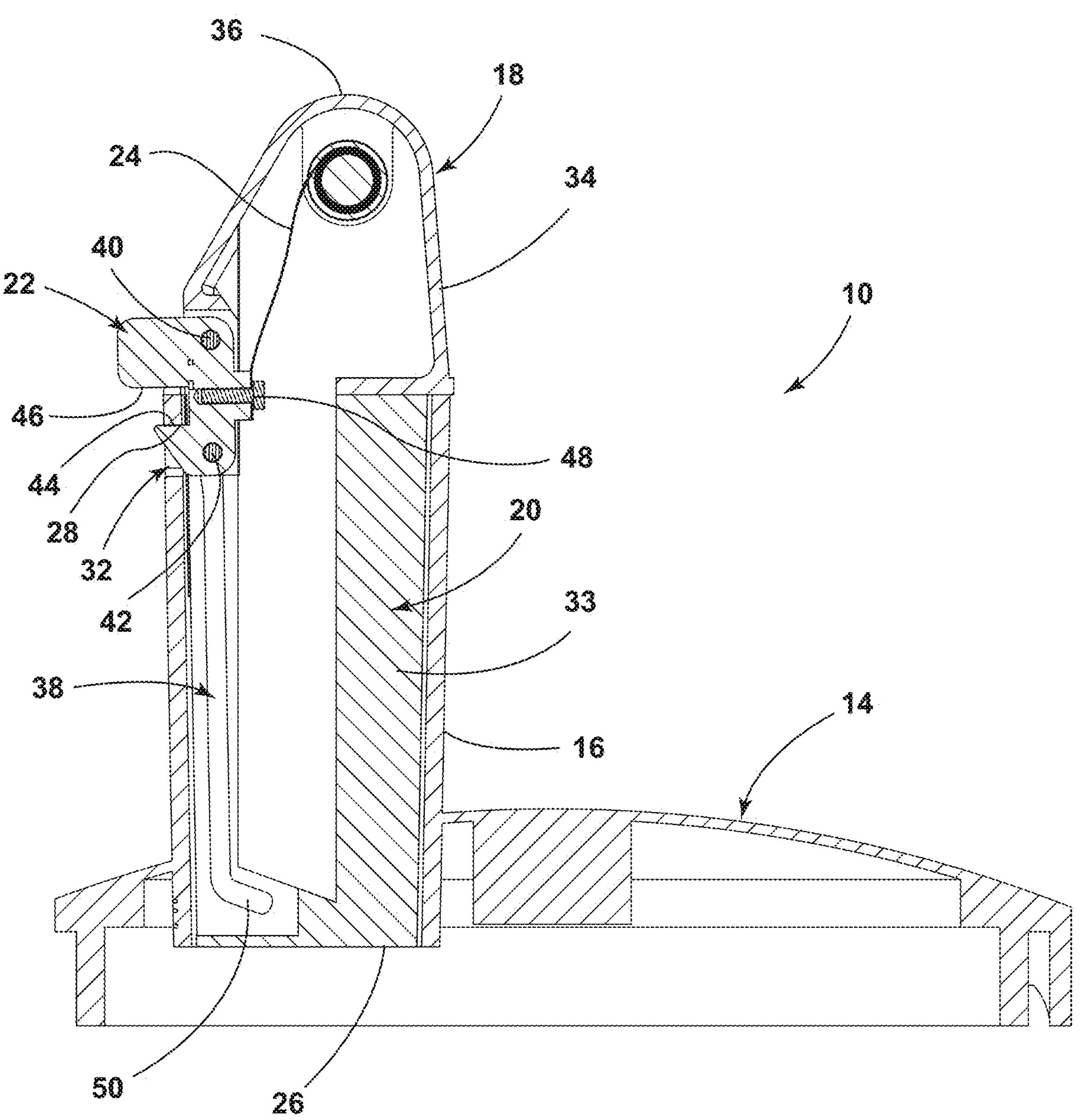
FIG. 7 is a cross-sectional view of the pusher assembly and lid of FIG. 6 taken at line VII-VII illustrating the pusher assembly inserted into the chute in the fired condition, wherein a spring is in a contracted condition.

Referring now to FIGS. 1-7, the pusher assembly 18 includes the spring 24. The spring 24 is operably coupled with the pusher body 20. For example, as illustrated in FIGS. 3, 5, and 7, the spring 24 is operably coupled and housed within the housing 34 of the pusher body 20. In the illustrated embodiment, the spring 24 is a constant force spring that winds and unwinds about an axis during contraction and extension of the constant force spring, respectively. It is contemplated that the spring 24 may be a variety of types of springs, in various implementations.

Referring still to FIGS. 1-7, the spring 24 of the pusher assembly 18 is operably coupled with the catch feature 22 of the pusher assembly 18. In the embodiment illustrated in FIG. 3, the spring 24 is fastened to the catch feature 22 by a fastener 48. In various implementations, the spring 24 is configured to bias the catch feature 22 relative to the pusher body 20 of the pusher assembly 18. In various implementations, the spring 24 is operable between the extended condition, as illustrated in FIG. 3, and the contracted condition, as illustrated in FIG. 7. The spring 24 may be biased toward the contracted condition while in the extended condition. In the embodiment illustrated in FIGS. 1-7, the spring 24 is configured to exert a biasing force on the catch feature 22 relative to the pusher body 20 to which the spring 24 is operably coupled, such that the catch feature 22 is urged away from the bottom 26 of the pusher body 20. For example, in the extended condition of the spring 24, the spring 24 may urge the catch feature 22 upward due to the tendency of the resilient spring 24 to return to the contracted condition.

Referring now to FIGS. 2-7, the pusher assembly 18 is operable between the cocked condition and the fired condition. As illustrated in FIGS. 2 and 3, in the cocked condition of the pusher assembly 18, the spring 24 is in the extended condition and biases toward the contracted condition. Further, the catch feature 22 coupled to the spring 24 is disposed at a first position along the pusher body 20 proximate to the bottom 26 of the pusher body 20 and is engaged with the pusher body 20 to maintain the spring 24 in the extended condition. In the fired condition of the pusher assembly 18, the spring 24 is in the contracted condition and the catch feature 22 is disposed at a second position along the pusher body 20 that is further than the first position from the bottom 26 of the pusher body 20, as illustrated in FIGS. 6 and 7.

Referring to FIGS. 2-7, the spring 24 of the pusher assembly 18 may be configured to bias the pusher body 20 relative to the lid 14 of the food processor assembly 10 to urge movement of the pusher body 20 within the chute 16 toward the receptacle 12. For example, the catch feature 22 to which the spring 24 is operably coupled may be engaged with the engagement feature 28 of the chute 16 of the lid 14. As such, movement of the pusher assembly 18 from the cocked condition, as illustrated in FIG. 3, to the fired condition, as illustrated in FIG. 7, causes the pusher body 20 to be drawn toward the receptacle 12 within the chute 16 due to the bias of the spring 24 that rebounds from the extended condition to the contracted condition. In various implementations, when the catch feature 22 is engaged with the engagement feature 28 coupled to the lid 14, the pusher assembly 18 transitioning from the cocked condition to the fired condition prompts the pusher body 20 to be drawn toward the receptacle 12 within the chute 16 of the lid 14. In some implementations, partial insertion of the pusher assembly 18 into the chute 16 causes the catch feature 22 to become engaged with the engagement feature 28 and the pusher assembly 18 to move from the cocked condition to the fired condition, such that the pusher body 20 is drawn toward the receptacle 12 within the chute 16. Further, in some implementations, withdrawing the pusher assembly 18 from the chute 16 causes the pusher assembly 18 to move from the fired condition to the cocked condition.

In operation of an exemplary embodiment of the food processor assembly 10 illustrated in FIGS. 1-7, initially, the pusher assembly 18 is inserted into the chute 16 and is in the fired condition, as illustrated in FIGS. 6 and 7. As illustrated in FIGS. 6 and 7, the spring 24 is in the contracted condition, the catch feature 22 is disposed at an upper terminal end of the channel 38 defined by the pusher body 20, and the first catch 44 of the catch feature 22 is disposed within the receiver 32 defined by the chute 16 of the lid 14. As such, the first catch 44 is engaged with the engagement feature 28 that defines the receiver 32 when the pusher assembly 18 is inserted into the chute 16 and in the fired condition.

Next, the user, desiring to remove the pusher assembly 18 from the chute 16 to introduce food into the chute 16, withdraws the pusher assembly 18 from the chute 16 of the lid 14. As the pusher assembly 18 is withdrawn, the first catch 44 of the catch feature 22 remains in engagement with the engagement feature 28, such that the pusher body 20 moves within the chute 16 away from the receptacle 12, while the catch feature 22 remains generally stationary, as illustrated in FIG. 7 and then FIG. 5, sequentially. As such, the channel 38 defined by the pusher body 20 slides relative to the catch feature 22 and the pins 40, 42 of the catch feature 22 as the user withdraws the pusher assembly 18. The spring 24 that is operably coupled to both the catch feature 22 and the pusher body 20 moves from the contracted condition, as illustrated in FIG. 7, to the extended condition, as illustrated in FIG. 3.

As illustrated in FIGS. 3, 5, and 7, the channel 38 defined by the pusher body 20 includes a stop portion 50 proximate to the bottom 26 of the pusher body 20. As illustrated in FIG. 3, as the pusher body 20 moves upward within the chute 16 relative to the generally stationary catch feature 22, at least one of the pins 40, 42 of the catch feature 22 encounters the stop portion 50 of the channel 38. Because the stop portion 50 angles inboard toward the terminal end of the channel 38, the stop portion 50 of the channel 38 encountering the second pin 42 of the catch feature 22 prompts the catch feature 22 to move, such that the first catch 44 of the catch feature 22 disengages the engagement feature 28 of the chute 16 of the lid 14. This disengagement of the first catch 44 of the catch feature 22 from the engagement feature 28 allows the pusher assembly 18 to be wholly withdrawn from the chute 16, as illustrated in FIGS. 1 and 2. Further, as illustrated in FIG. 3, the contact between the channel 38 of the pusher body 20 and at least a portion of the catch feature 22 (e.g., the at least one pin 40, 42) due to biasing force exerted on the catch feature 22 by the spring 24 causes the catch feature 22 to remain in the position illustrated in FIGS. 1-3 after removal of the pusher assembly 18 from the chute 16, such that the pusher assembly 18 is maintained in the cocked condition.

Having withdrawn the pusher assembly 18, and in doing so transitioning the pusher assembly 18 from the fired condition to the cocked condition, the user inserts food into the chute 16 of the lid 14. Next, the user partially inserts the pusher assembly 18 into the chute 16 of the lid 14 to push the food within the chute 16 downward toward the receptacle 12 for processing by the rotatable tool within the receptacle 12. As the pusher assembly 18 is partially inserted into the chute 16, the second catch 46 of the catch feature 22 contacts a portion of the chute 16. This contact with the chute 16 as the pusher body 20 is inserted further into the chute 16 causes the catch feature 22 to move out of the angled stop portion 50 at the terminal end of the channel 38 in an arching motion that follows the curvature of the stop portion 50 of the channel 38. As a result, the first catch 44 of the catch feature 22 is received within the receiver 32 defined by the chute 16 and engaged with the engagement feature 28. Further, the movement of the catch feature 22 away from the stop portion 50 of the channel 38 allows the spring 24 to contract and cause relative movement of the catch feature 22 and the pusher body 20, both of which are operably coupled to the spring 24. As the first catch 44 of the catch feature 22 is engaged with the engagement feature 28 of the chute 16, movement of the spring 24 from the extended condition, as illustrated in FIG. 7, to the contracted condition, as illustrated in FIG. 3, results in movement of the pusher body 20 relative to the generally stationary catch feature 22 further into the chute 16 toward the receptacle 12. As the spring 24 is a constant force spring, the pusher body 20 is urged toward the receptacle 12 via the bias of the spring 24 with continuous force. As such, the pusher body 20 without external force applied by the user may push the food within the chute 16 downward into the receptacle 12 for processing therein as the pusher assembly 18 transitions to the fired condition, as illustrated in FIGS. 6 and 7.

The food processor assembly 10 of the present disclosure provides a variety of advantages. First, the spring 24 being configured to draw the pusher body 20 into the chute 16 without the application of force externally by a user allows for a consistent and convenient pushing of food into the chute 16 during food processing. Second, removal of the pusher assembly 18 from the chute 16 prompting the pusher assembly 18 to move from the fired condition to the cocked condition, and partial insertion of the pusher assembly 18 into the chute 16 prompting movement of the pusher assembly 18 from the cocked condition to the fired condition, may provide for convenient and intuitive operation of the pusher assembly 18. Third, the pusher assembly 18 can be reset manually to the cocked condition from the fired condition without insertion into the chute 16. Fourth, in the embodiment illustrated in FIG. 2, wherein the engagement feature 28 is a portion of flexible tab of the chute 16, the flexible tab of the chute 16 may be resiliently deformed outward to allow for insertion of pusher assembly 18 into the chute 16 while the pusher assembly 18 is in the fired condition.

According to one aspect of the present disclosure, a food processor assembly includes a receptacle for receiving food therein, a lid configured to selectively cover the receptacle and having a chute for conveying food into the receptacle, and a pusher assembly for insertion into the chute. The pusher assembly includes a pusher body, a catch feature movably coupled with the pusher body, and a spring operably coupled to the catch feature and the pusher body. The pusher assembly is operable between a cocked condition and a fired condition. In the cocked condition of the pusher assembly, the spring is in an extended condition and biased toward a contracted condition and the catch feature coupled to the spring is disposed at a first position along the pusher body proximate to a bottom of the pusher body and is engaged with the pusher body to maintain the spring in the extended condition. In the fired condition of the pusher assembly, the spring is in the contracted condition and the catch feature is disposed at a second position along the pusher body that is further than the first position from the bottom of the pusher body. Further, the catch feature is configured to be selectively engaged with an engagement feature coupled to the lid, such that movement of the pusher assembly from the cocked condition to the fired condition causes the pusher body to be drawn toward the receptacle within the chute.

According to another aspect, partial insertion of the pusher assembly into the chute causes the catch feature to become engaged with the engagement feature and the pusher assembly to move from the cocked condition to the fired condition, such that the pusher body is drawn toward the receptacle within the chute.

According to another aspect, withdrawing the pusher assembly from the chute causes the pusher assembly to move from the fired condition to the cocked condition.

According to another aspect, the spring is a constant force spring.

According to another aspect, the pusher body includes a base that forms the bottom of the pusher body, and a housing that is coupled to the base and that forms a top of the pusher body opposite the bottom. The housing houses the spring in the fired condition of the pusher assembly.

According to another aspect, the base is integrally coupled with the housing.

According to another aspect of the present disclosure, a food processor assembly includes a receptacle for receiving food therein, a lid configured to selectively cover the receptacle and having a chute for conveying food into the receptacle, and a pusher assembly configured to push food through the chute and into the receptacle. The pusher assembly includes a pusher body, and a spring that biases the pusher body relative to the lid to urge movement of the pusher body within the chute toward the receptacle.

According to another aspect, the pusher assembly further includes a catch feature that is movably coupled with the pusher body and operably coupled with the spring. The catch feature is configured to be selectively engaged with an engagement feature coupled with the chute, such that the spring biases the pusher body relative to the lid due to the engagement of the catch feature with the engagement feature coupled to the chute of the lid.

According to another aspect, the pusher assembly is operable between a cocked condition and a fired condition. In the cocked condition of the pusher assembly, the spring is in an extended condition and biased toward a contracted condition and the catch feature is disposed at a first position along the pusher body proximate to a bottom of the pusher body. In the fired condition of the pusher assembly, the spring is in the contracted condition and the catch feature is disposed at a second position along the pusher body that is further than the first position from the bottom of the pusher body.

According to another aspect, movement of the pusher assembly from the cocked condition to the fired condition causes the pusher body to be drawn toward the receptacle within the chute.

According to another aspect, partial insertion of the pusher assembly into the chute causes the catch feature to become engaged with the engagement feature and the pusher assembly to move from the cocked condition to the fired condition, such that the pusher body is drawn toward the receptacle within the chute.

According to another aspect, withdrawing the pusher assembly from the chute causes the pusher assembly to move from the fired condition to the cocked condition.

According to another aspect, the pusher body includes a base that forms the bottom of the pusher body, and a housing that is coupled to the base and that forms a top of the pusher body opposite the bottom. The housing houses the spring in the fired condition of the pusher assembly.

According to another aspect, the base is integrally coupled with the housing.

According to another aspect, the spring is a constant force spring.

According to yet another aspect of the present disclosure, a pusher assembly for a food processor assembly includes a pusher body for insertion into a chute of said food processor assembly, and a spring operably coupled with the pusher body.

According to another aspect, the spring is a constant force spring.

According to another aspect, the pusher assembly further includes a catch feature movably coupled to the pusher body and operably coupled with the spring, such that the spring biases the catch feature relative to the pusher body.

According to another aspect, the spring is in an extended condition and biased toward a contracted condition and the catch feature coupled to the spring is disposed at a first position along the pusher body proximate to a bottom of the pusher body and is engaged with the pusher body to maintain the spring in the extended condition in a cocked condition of the pusher assembly, and the spring is in the contracted condition and the catch feature is disposed at a second position along the pusher body that is further than the first position from the bottom of the pusher body in a fired condition of the pusher assembly.

According to another aspect, the pusher body includes a base that forms the bottom of the pusher body, and a housing that is coupled to the base and that forms a top of the pusher body opposite the bottom. The housing houses the spring in the fired condition of the pusher assembly.

It will be understood by one having ordinary skill in the art that construction of the described disclosure and other components is not limited to any specific material. Other exemplary embodiments of the disclosure disclosed herein may be formed from a wide variety of materials, unless described otherwise herein.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

What is claimed is:

1. A food processor assembly, comprising:

a receptacle for receiving food therein;

a lid configured to selectively cover the receptacle and having a chute for conveying food into the receptacle; and a pusher assembly for insertion into the chute, comprising:

a pusher body;

a catch feature movably coupled with the pusher body; and a spring operably coupled to the catch feature and the pusher body, wherein the pusher assembly is operable between a cocked condition, wherein the spring is in an extended condition and biased toward a contracted condition and the catch feature coupled to the spring is disposed at a first position along the pusher body proximate to a bottom of the pusher body and is engaged with the pusher body to maintain the spring in the extended condition, and a fired condition, wherein the spring is in the contracted condition and the catch feature is disposed at a second position along the pusher body that is further than the first position from the bottom of the pusher body;

wherein the catch feature is configured to be selectively engaged with an engagement feature coupled to the lid, such that movement of the pusher assembly from the cocked condition to the fired condition causes the pusher body to be drawn toward the receptacle within the chute.

2. The food processor assembly of claim 1, wherein the catch feature is selectively engaged with the engagement feature and the pusher assembly to move from the cocked condition to the fired condition, such that the pusher body is drawn toward the receptacle within the chute.

3. The food processor assembly of claim 1, wherein the pusher assembly is configured to move from the fired condition to the cocked condition when the pusher assembly is withdrawn from the chute.

4. The food processor assembly of claim 1, wherein the spring is a constant force spring.

5. The food processor assembly of claim 1, wherein the pusher body comprises:

a base that forms the bottom of the pusher body; and a housing that is coupled to the base and that forms a top of the pusher body opposite the bottom, wherein the housing houses the spring in the fired condition of the pusher assembly.

6. The food processor assembly of claim 5, wherein the base is integrally coupled with the housing.

7. A food processor assembly, comprising:

a receptacle for receiving food therein;

a lid configured to selectively cover the receptacle and having a chute for conveying food into the receptacle; and a pusher assembly configured to push food through the chute and into the receptacle, comprising:

a pusher body;

a spring that biases the pusher body relative to the lid to urge movement of the pusher body within the chute toward the receptacle; and a catch feature that is movably coupled with the pusher body and operably coupled with the spring, wherein the catch feature is configured to be selectively engaged with an engagement feature coupled with the chute, such that the spring biases the pusher body relative to the lid due to the engagement of the catch feature with the engagement feature coupled to the chute of the lid, the pusher assembly being operable between:

a cocked condition, wherein the spring is in an extended condition and biased toward a contracted condition and the catch feature is disposed at a first position along the pusher body proximate to a bottom of the pusher body; and a fired condition, wherein the spring is in the contracted condition and the catch feature is disposed at a second position along the pusher body that is further than the first position from the bottom of the pusher body.

8. The food processor assembly of claim 7, wherein the pusher body is drawn toward the receptacle within the chute when the pusher assembly is moved from the cocked condition to the fired condition.

9. The food processor assembly of claim 8, wherein the catch feature is selectively engaged with the engagement feature and the pusher assembly to move from the cocked condition to the fired condition, such that the pusher body is drawn toward the receptacle within the chute.

10. The food processor assembly of claim 9, wherein the pusher assembly is configured to move from the fired condition to the cocked condition when the pusher assembly is withdrawn from the chute.

11. The food processor assembly of claim 10, wherein the pusher body comprises:

a base that forms the bottom of the pusher body; and a housing that is coupled to the base and that forms a top of the pusher body opposite the bottom, wherein the housing houses the spring in the fired condition of the pusher assembly.

12. The food processor assembly of claim 11, wherein the base is integrally coupled with the housing.

13. The food processor assembly of claim 7, wherein the spring is a constant force spring.

14. A pusher assembly for a food processor assembly, comprising:

a pusher body for insertion into a chute of said food processor assembly;

a spring operably coupled with the pusher body; and a catch feature movably coupled to the pusher body and operably coupled with the spring, such that the spring biases the catch feature relative to the pusher body, wherein the spring is in an extended condition when the spring is biased toward a contracted condition and the catch feature coupled to the spring is disposed at a first position along the pusher body proximate to a bottom of the pusher body and is engaged with the pusher body to maintain the spring in the extended condition in a cocked condition of the pusher assembly, and the spring is in the contracted condition when the catch feature is disposed at a second position along the pusher body that is further than the first position from the bottom of the pusher body in a fired condition of the pusher assembly.

15. The pusher assembly of claim 14, wherein the spring is a constant force spring.

16. The pusher assembly of claim 14, wherein the pusher body comprises:

a base that forms the bottom of the pusher body; and a housing that is coupled to the base and that forms a top of the pusher body opposite the bottom, wherein the housing houses the spring in the fired condition of the pusher assembly.

* * * * *